United States Patent
Goebel

(10) Patent No.: US 6,505,510 B2
(45) Date of Patent: Jan. 14, 2003

(54) APPARATUS FOR MEASURING FORCES PRODUCED BY UNBALANCE OF A ROTARY MEMBER

(75) Inventor: Eickhart Goebel, Pfungstadt (DE)

(73) Assignee: Snap-On Deutschand Holding GmbH, Mettmann (DE)

( * ) Notice: Subject to any disclaimer, the term of this patent is extended or adjusted under 35 U.S.C. 154(b) by 45 days.

(21) Appl. No.: 09/757,642

(22) Filed: Jan. 11, 2001

(65) Prior Publication Data

US 2001/0008085 A1 Jul. 19, 2001

(30) Foreign Application Priority Data

Jan. 14, 2000 (DE) .......................... 100 01 356

(51) Int. Cl.$^7$ .............................. G01M 1/02; G01M 1/22
(52) U.S. Cl. ........................................... 73/462; 73/475
(58) Field of Search .......................... 73/462, 460, 468, 73/471, 475, 476, 477, 464, 487

(56) References Cited

U.S. PATENT DOCUMENTS 4,011,761 A * 3/1977 Ito .............................. 73/462

FOREIGN PATENT DOCUMENTS

DE        199 08 147    * 8/2000

* cited by examiner

Primary Examiner—Helen Kwok
(74) Attorney, Agent, or Firm—Shook, Hardy & Bacon L.L.P.

(57) ABSTRACT

An apparatus for the measurement of centrifugal forces generated by a rotary member such as a vehicle wheel which is out of balance, comprises a rotary member mounting for supporting the rotary member with respect to an apparatus frame structure. The rotary member and the rotary member mounting form a sub-critical oscillating system in measurement of the rotary member which rotates for a measuring procedure. The apparatus further includes a measurement sensor which is in the form of a force pick-up and whose direction of application of force extends approximately tangentially to a circle through the location of the application of force at the measurement sensor, around a virtual mounting location.

15 Claims, 5 Drawing Sheets

APPARATUS FOR MEASURING FORCES PRODUCED BY UNBALANCE OF A ROTARY MEMBER

FIELD OF THE INVENTION

The invention concerns an apparatus for measuring forces produced by unbalance of a rotary member as it rotates, for example a motor vehicle wheel.

BACKGROUND OF THE INVENTION

A typical form of apparatus for measuring centrifugal forces produced in rotation of an unbalanced rotary member, for example as disclosed in German published specification (DE-AS) No 16 98 164, comprises a rotary member mounting arrangement for supporting the rotary member with respect to a frame structure. The rotary member and the rotary member mounting arrangement constitute a system which is oscillatable about an oscillation center, for applying centrifugal forces to a force-application location of at least one measurement pick-up which is supported on the frame structure. That apparatus therefore involves an oscillation-measuring, super-critical measurement system in which the rotary member is supported on leaf springs which are disposed inclinedly relative to each other and the prolongations of which form a virtual intersection in one of the balancing planes of the rotary member to be balanced. The two inclinedly disposed leaf springs are supported with respect to a base plate by way of an intermediate plate on leaf springs which are turned through 90° relative to the first-mentioned inclined leaf springs and which are arranged in parallel relationship with each other and which are disposed perpendicularly. The assembly includes oscillation converters for detecting the oscillations of the leaf springs, which result from unbalance of the rotary member, and converting same into suitable measurement signals.

Attention may be directed in this respect to German published specifications (DE-AS) Nos 10 27 427 and 10 44 531 in which spring bars or leaf springs forming oscillatable mounting arrangements in balancing machines include reduced-thickness portions to form hinge or pivot means.

Reference may also be made to EP 0 343 265 A1 disclosing a balancing machine in which a support carrier which extends axially with respect to a measurement shaft on which a rotary member to be balanced is mounted in such a way as to be capable of oscillation with respect to a stationary frame structure, while measurement sensors which are disposed at an axial spacing from each other are arranged between the support carrier and the stationary frame structure.

DE 33 30 880 A1 discloses an arrangement in which a support assembly for carrying a rotary mounting structure for a measurement shaft is supported on a stationary frame structure by way of force measurement transducers arranged at an axial spacing from each other.

Reference may also be made to EP 0 133 229 A1 disclosing an apparatus which serves for balancing motor vehicle wheels, wherein a measurement shaft on which a motor vehicle wheel to be balanced is carried is supported on a frame in a mounting arrangement having force-measurement sensors. To provide for dynamic balancing, that machine has two mounting planes for supporting the measurement shaft, with the force-measurement sensors also being disposed in those mounting planes.

It will be noted in this respect that the measurement pick-ups or sensors which are disposed at the measurement locations in the mounting planes of the above-outlined apparatuses produce measurement signals proportional to the centrifugal forces which result from unbalance of the rotary member and which produce in the mounting planes or at the measurement locations, the reaction forces which are measured by the measurement sensors. Conventional standard measurement systems for wheel balancing machines usually employ a cantilever mounting configuration for supporting the measurement shaft and a rotary member to be balanced which is carried thereon. Conversion to the two balancing planes on the rotary member, to provide for dynamic balancing, is effected on the basis of the force-lever laws of statics. The forces measured by the force-measurement sensors in the above-mentioned mounting planes are therefore dependent on the respective spacing of the rotary member with respect to the two measurement sensors.

It will be appreciated that the differences in mass distribution which give rise to unbalance effects on the rotary member or rotational body involve resultants in respect of the centrifugal forces to be measured, which take effect at different axial positions and which are applied to the measurement sensors during a measurement run. The geometrical data of the measurement sensor linkage and the measurement planes give rise to transverse force components at the support locations of the measurement sensors, which cause phase shifts and have an adverse effect on the level of measurement accuracy.

SUMMARY OF THE INVENTION

An object of the present invention is to provide an apparatus for measuring centrifugal forces produced by an unbalanced rotary member, which can achieve a high level of measurement accuracy.

Another object of the present invention is to provide an apparatus for measuring centrifugal forces caused by unbalance of a rotary member as it rotates, which while being of a simple structure permits accurate measurement of the forces involved in a sub-critical mode of operation.

Still another object of the present invention is to provide an apparatus for measuring centrifugal force caused by unbalance of a rotary member as it rotates, wherein the rotary member is supported by a virtually rigid mounting configuration thereby to provide for an enhanced level of accuracy in terms of transmission of the centrifugal force to a measurement member.

In accordance with the principles of the present invention the foregoing and other objects are attained by an apparatus for measuring centrifugal forces produced by an unbalanced rotary member, comprising a support means such as a frame structure, and a rotary member mounting means for supporting the rotary member with respect to the support means. The rotary member and the rotary member mounting means form a system which is capable of oscillating about an oscillation center for applying centrifugal forces to a force-application location of at least one measurement sensor or pick-up which is supported on the support means. The rotary member mounting means and the rotary member which in operation of the apparatus is supported thereby and rotates in a measurement operation form a sub-critical oscillating assembly. The measurement sensor is a force pick-up means. The direction of application of force to the measurement sensor extends substantially tangentially with respect to a circular arc through the force-application location around the oscillation center.

As will be seen in greater detail from the description hereinafter of preferred embodiments of the invention, the invention provides that the support configuration for the rotary member mounting means and the measurement sensors which are used as force pick-up means is such that the result is a sub-critical oscillation system in which the spring forces involved are greater than the centrifugal forces of the unbalanced rotary member which rotates during a measurement run. The spring forces of the rotary member mounting means are so high that practically no spring deflection occurs and thus the rotary member mounting means form a rigid mounting. The apparatus has a cantilever mounting configuration, as is conventional in wheel balancing machines, for supporting the rotary member. In other words, the rotary member is secured to the measurement shaft at a location which is outside the location at which the measurement shaft is supported on the machine frame structure. The rotary member can be supported in the rotary member mounting means in such a way that support struts which are provided for that purpose intersect with their notional prolongations at an axis which forms the oscillation center of the sub-critical oscillation system. The direction of application of the centrifugal forces which are measured in a measurement run, to the measurement sensor which is in the form of a force pick-up means, extends substantially tangentially with respect to a circular arc through the force-application location around the oscillation center. The oscillation center can thus be defined by flexurally stiff supports, in particular two thereof, which can be of a generally plate-shaped configuration and which intersect at a linear intersection line forming a virtual mounting location for the rotary member in the rotary member mounting means. That virtual mounting location is tantamount to a virtual measurement location. That mounting location, of a linear configuration, extends substantially perpendicularly to the axis of the rotary member.

In a preferred feature of the invention the rotary member mounting means has a rotary mounting such as a mounting sleeve for supporting a measurement shaft on which the rotary member is fixed in a measurement run. As indicated above the rotary member may typically be a motor vehicle wheel.

The apparatus according to the invention can preferably be used for example in an arrangement as described in PCT/EP99/06372, corresponding to DE 198 39 976 A1. In that apparatus, the rotary mounting for the measurement shaft is supported on an intermediate frame structure by way of two flexurally stiff supports which can be of a plate-shaped configuration. The intermediate frame structure is in turn supported on a stationary frame structure by way of two further flexurally stiff supports which can also be plate-shaped. The supports of at least one of the two pairs thereof are arranged inclinedly relative to each other so that the prolongations thereof intersect at the oscillation center or the virtual mounting location substantially on the axis of the measurement shaft which also forms the axis of the rotary member. In addition the rotary mounting for the measurement shaft is supported on the intermediate frame structure by way of a first measurement sensor in the form of a force pickup means, and the intermediate frame structure is supported on the stationary frame structure by way of a second such measurement sensor in the form of a force pick-up means. In an embodiment of the present invention at least one of the two measurement sensors has a direction of application of force which is tangential with respect to the circular arc which passes through the respective force-application location and around the respective virtual mounting location.

In accordance with further preferred features of the invention the rotary mounting for the measurement shaft is supported with respect to the stationary frame at two support locations which are arranged at an axial spacing from each other and at which are arranged the measurement sensors which are here also in the form of force pick-up means. In this arrangement the assembly may form two virtual mounting locations or two real mounting locations.

It will be seen that, in the present invention, the centrifugal forces which occur during a measurement run by virtue of unbalance of the rotary member which is the subject of the measurement procedure are applied to the measurement sensor, with the same direction of application of force, by the rigid rotary member mounting means, irrespective of the respective mass distributions in the respective rotary members.

Further objects, features and advantages of the invention will be apparent from the description hereinafter of preferred embodiments of the invention.

DESCRIPTION OF PREFERRED EMBODIMENTS

Figure 1:
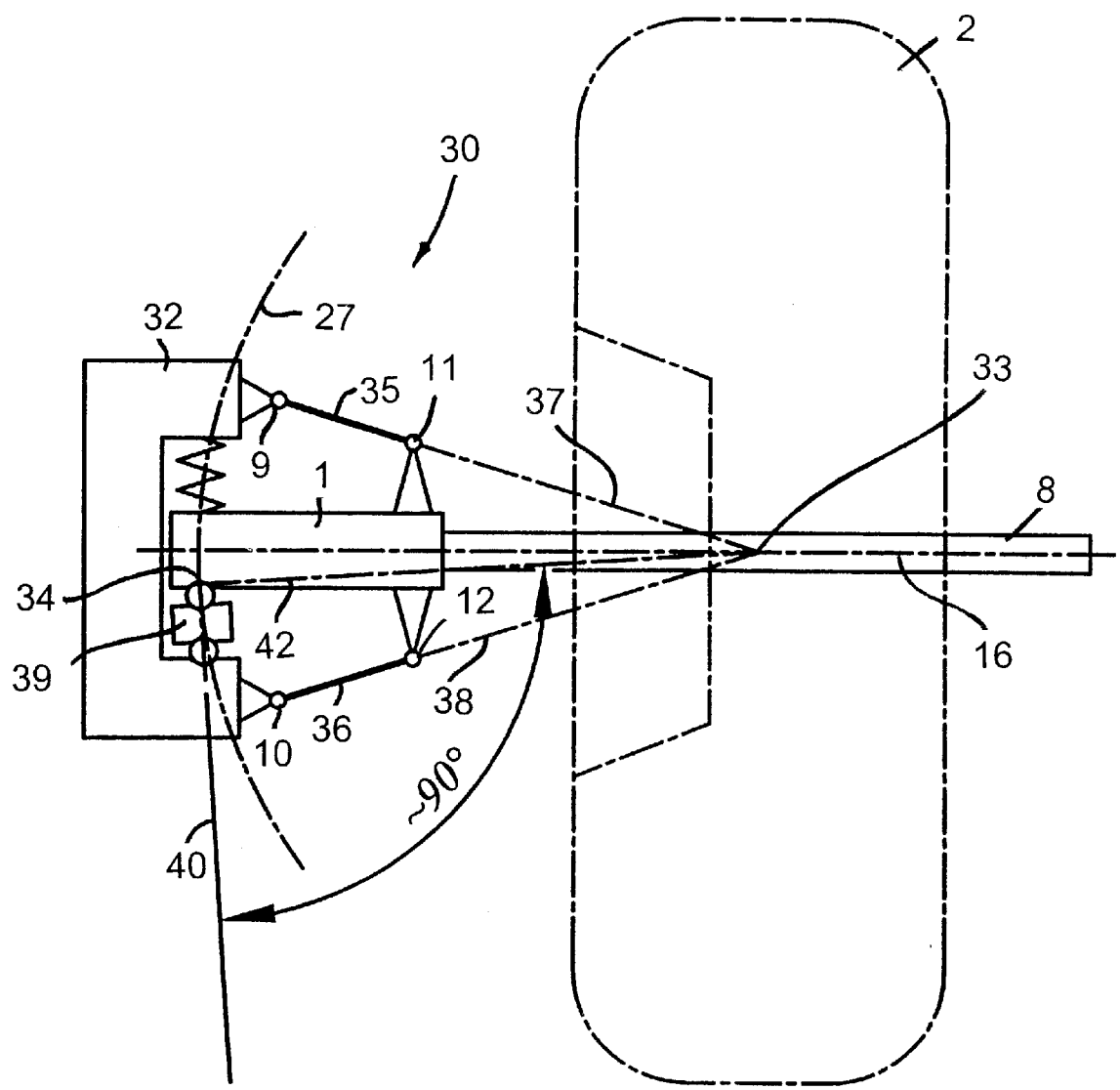
FIG. 1 is a diagrammatic view of a first embodiment of the apparatus according to the invention with a pair of supports.

Referring firstly to FIG. 1, shown therein in diagrammatic form is a first embodiment of an apparatus for measuring centrifugal force produced by the unbalance of a rotary member such as a motor vehicle wheel, as it is rotated, for example in a wheel balancing machine for ascertaining unbalance of the motor vehicle wheel.

Looking therefore at FIG. 1, reference numeral 30 therein indicates a rotary member mounting arrangement with which a measurement shaft 8 is rotatably supported in a rotary mounting 1 in the form of a mounting sleeve. The measurement shaft can be driven in rotation by any suitable drive (not shown), as described for example in above-mentioned DE 198 39 976 A1 whose disclosure in that respect is hereby incorporated into this specification. The rotary mounting 1 is supported by means of generally plate-shaped supports or struts 35, 36, for example in the form of leaf springs, which are flexurally stiff, on a frame 32 which can be a stationary frame structure or alternatively an intermediate frame structure as in the case of the embodiment of FIGS. 2 and 3 to which reference will be made hereinafter. Disposed at the ends of the two supports 35 and 36 are pivots respectively indicated at 9 through 12. The two pivots 11 and 12 are operatively disposed between the rotary mounting 1 and the two supports 35 and 36 respectively. The other two pivots 9 and 10 are operatively disposed between the frame 32 and the two supports 35 and 36 respectively. It will be noted that the pivots 9 through 12 are disposed at the ends of the two supports 35 and 36.

The supports 35 and 36 are arranged at an angle relative to each other in such a way that the pivots 9 through 12 are disposed at the corners of an isosceles trapezoid. Notional prolongations indicated at 37 and 38 of the respective supports 35 and 36 intersect at a virtual support location 33 which has an axis extending rectilinearly and perpendicularly to the axis indicated at 16 of the measurement shaft 8, represents an oscillation center of the oscillating system formed by the rotary member mounting arrangement with the rotary member 2.

The rotary mounting 1 is also supported on the frame 32 by way of a measurement sensor 39 which is in the form of a force pick-up device. The measurement sensor 39 is supported and biased in such a way that it forms a force pick-up which can be deemed to be rigid. The support location of the rotary mounting 1, by way of the measurement sensor 39, is at an axial spacing from the support location defined at the pivots 11 and 12 on the rotary mounting 1.

The rotary member 2 to be balanced, which as indicated above may be a motor vehicle wheel, can be secured to the measurement shaft 8 by means of a suitable form of clamping device, for example of conventional nature, so that the axis of the rotary member 2 and the axis 16 of the measurement shaft 8 coincide. The pivot axis of the virtual mounting location 33 which extends linearly is disposed at a right angle to the axis 16 of the measurement shaft 8 coincide. The pivot axis at the virtual mounting location 33 which extends linearly is disposed at a right angle to the axis 16 of the measurement shaft and parallel to the generally plate-shaped supports 35 and 36. In the illustrated embodiment of FIG. I the virtual mounting location 33 is on the axis 16 of the measurement shaft 8.

The arrangement of the measurement sensor 39 is such that its direction of application of force thereat extends along a tangent indicated at 40 in FIG. 1. The tangent 40 is applied at a force-application location 34 of the measurement sensor 39 to a circle of which part is indicated at 27 and which extends around the mounting location 33 through the force-application location 34. In combination with the rigid subcritical rotary member mounting arrangement 30 on the frame 32, the illustrated configuration provides for a positively guided direction of application of force, which is tangential to the circular path around the virtual mounting location 33 of the rotary member mounting arrangement 30.

Figure 2:
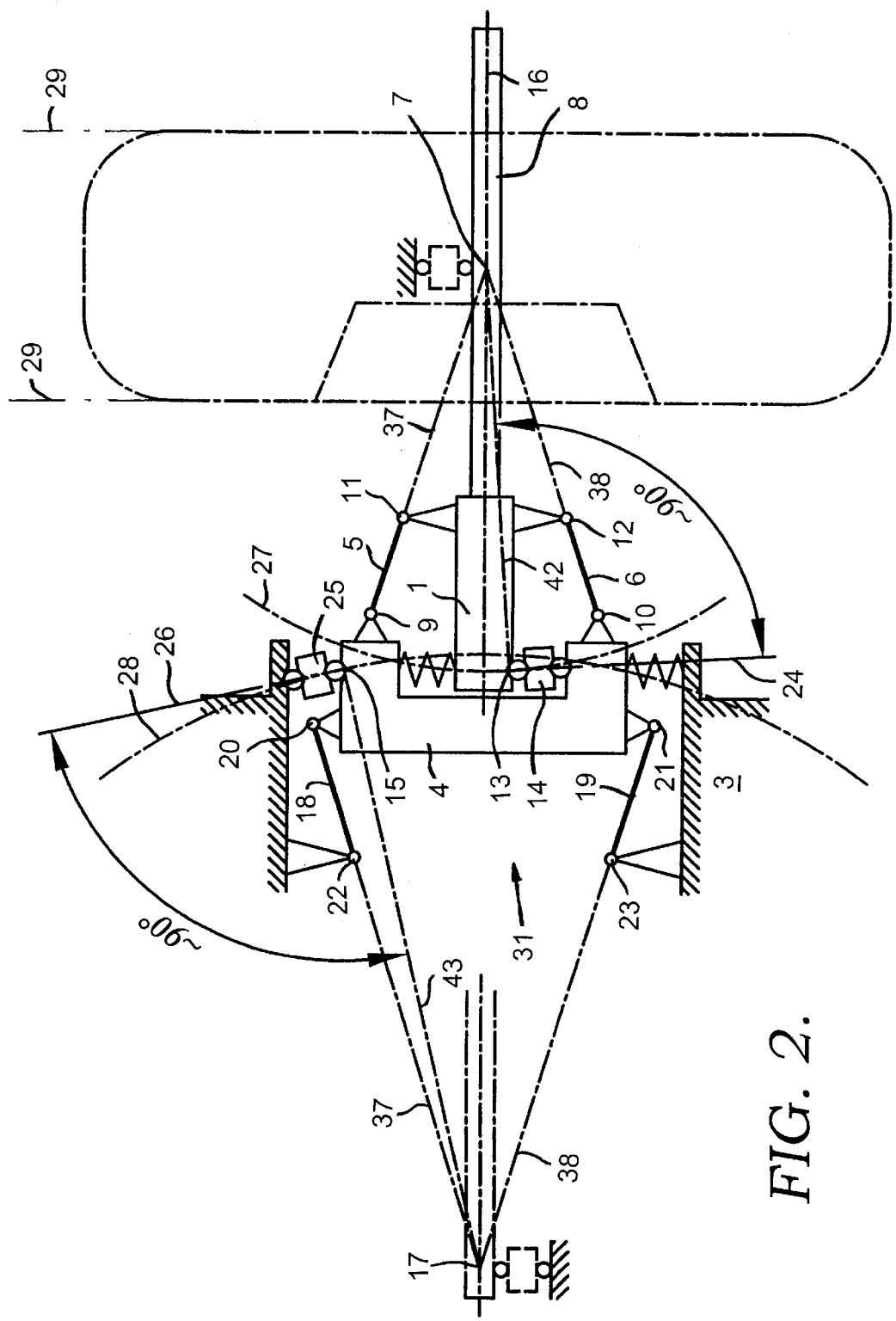
FIG. 2 is a diagrammatic view of a second embodiment of the apparatus according to the invention with two pairs of supports.

Reference will now be made to FIG. 2 showing another embodiment of the invention which includes a modified form of rotary member mounting arrangement as indicated generally at 31. The rotary member mounting arrangement 31 in this embodiment includes an intermediate frame which is generally indicated at 4. Supported on the intermediate frame 4 is an oscillation system which corresponds to the oscillation system illustrated in FIG. 1. It also has the rotary mounting 1 for the measurement shaft 8. The illustrated assembly also has supports 5 and 6 which can also be generally plate-shaped, for example in the form of leaf springs, and which are flexurally stiff. The supports 5 and 6 are suitably connected to the rotary mounting 1 by way of pivots 11 and 12.

At their other ends, the supports 5 and 6 are suitably connected to the intermediate frame 4 by way of respective pivots 9 and 10. At an axial spacing from the support location afforded by the pivots 11 and 12 the rotary mounting 1 is supported to the intermediate frame 4 by way of a measurement sensor 14 which once again is in the form of a force pick-up device. This measurement sensor 14 is also supported and held in place in such a way that it forms a force pick-up device which can be deemed to be rigid. The direction of application of force to a force-application location indicated at 13, at which the measurement sensor 14 is supported on the rotary mounting 1, is on a tangent 24 to a circle of which part is indicated at 27 and which extends through the force-application location 13. The circle 27 is drawn around a virtual mounting location indicated at 7, which is constituted by virtue of the intersection line of the notional prolongations 37 and 38 of the supports 5 and 6 which extend inclinedly with respect to the axis 16 of the measurement shaft 8, as can be clearly seen from FIG. 2. The virtual mounting location 7 forms the oscillation center of the oscillation system which is supported on the intermediate frame 4. The measurement sensor 14 is arranged inclinedly corresponding to the tangential direction of the circular arc 27 at the support location 13 so that the direction of application of force to the measurement sensor 15 substantially corresponds to the tangent 24.

Figure 3:
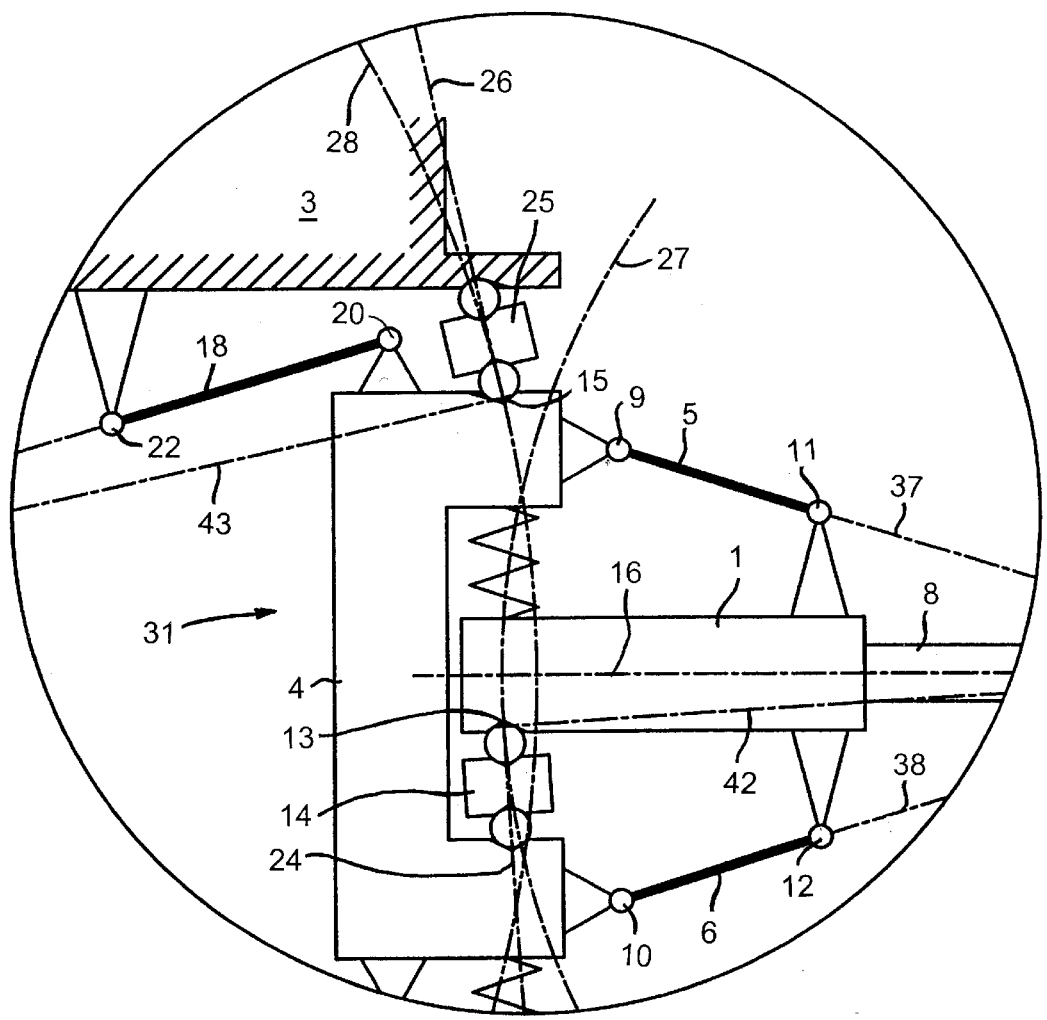
FIG. 3 is a detail view of the rotary member mounting arrangement in the second embodiment shown in FIG. 2.

In the rotary member mounting arrangement 31 of the embodiment shown in FIGS. 2 and 3, the intermediate frame 4 is supported on the stationary frame 3 by way of a further measurement sensor 25 which is also in the form of a force pick-up device. The intermediate frame 4 is also supported on the stationary frame 3 by way of supports 18 and 19, at a support location formed by pivots 20 and 21. The supports 18 and 19 are also of a preferably plate-shaped configuration, for example in the form of leaf springs. Pivots 22 and 23 are operatively disposed between the stationary frame 3 and the respective supports 18 and 19. Notional prolongations 37 and 38 of the supports 18 and 19 which are arranged at an angle relative to each other intersect at a virtual mounting location 17. In regard to the intermediate frame 4, the virtual mounting location 17 is disposed in opposite relationship to the mounting location 7 on a virtual prolongation of the measurement shaft 8, in particular on the axis 16 of the measurement shaft. The pivots 20 through 23 of the supports 18 and 19 are also disposed at the corners of an isosceles trapezoid. It will be noted that in this embodiment the inclination of the supports 18 and 19 is in opposite relationship to the inclination of the supports 5 and 6. The supports 5, 6 and 18, 19 are not turned relative to each other about the axis 16 of the measurement shaft 8.

It will be seen from FIG. 2 and in greater detail from the view on a larger scale in FIG. 3 that the measurement sensor 25 is also arranged with its direction of application of force inclinedly with respect to the axis 16 of the measurement shaft 8. The direction of application of force extends on a tangent indicated at 26 to a circle of which a portion is shown at 28 and which extends through a force-application location 15 around the virtual mounting location 17. The force-application location 15 is thus operatively disposed between the intermediate frame 4 and the measurement sensor 25. The measurement sensor 25 is also in the form of a force pick-up device which can be deemed to be rigid and which is supported at its other side at the stationary frame 3.

It will be seen that the way in which the tangents 26 and 24 to the respective circles 28 and 27 extend depends on the angles which are formed between the connecting lines diagrammatically indicated at 43 and 42 respectively from the respective virtual mounting locations 17 and 7 to the force-application locations 15 and 13 at the respective measurement sensors 25 and 14, with respect to the axis 16 of the measurement shaft 8. The respective tangents 26 and 24 extend approximately at a right angle to the above-mentioned respective connecting lines 43 and 42. If the arrangement of the supports is such that for example the virtual mounting location 17 which is shown at the left in FIG. 2 is far away from the rotary member mounting arrangement 31, for example at a spacing of 10 or 20 meters and/or the measurement sensor 25 is closer to the measurement shaft 8, then the tangent 26 to the circle 28 extends approximately perpendicularly to the measurement shaft 8. When the rotary member mounting arrangement 31 is of such a configuration, it is sufficient if one of the two measurement sensors, for example the measurement sensor 14, is oriented with its force-application direction along the tangent 24 and the other measurement sensor, that is to say for example the measurement sensor 25, is oriented with its force-application direction substantially perpendicularly to the axis 16 of the measurement shaft.

As described in above-mentioned DE 198 39 976 A1, the pivots 9 through 12 and 20 through 23 can be in the form of linearly extending weak locations in the supports which are preferably in the form of flexurally stiff plate members. In addition, the virtual mounting locations indicated at 33 in FIG. 1 and at 7 and 17 in FIGS. 2 and 3 are disposed outside balancing planes as indicated at 29 in FIG. 2, in which a balancing operation is carried out on the rotary member 2, for example and more particularly in the form of a motor vehicle wheel, for example by adding suitable balancing weights. Preferably, the mounting location 33 in FIG. 1 is approximately centrally disposed between the two balancing planes 29 while in the embodiment of FIGS. 2 and 3 one of the two mounting locations, being the mounting location indicated at 7 in FIG. 2, is disposed approximately centrally between the two balancing planes 29.

Figure 4:
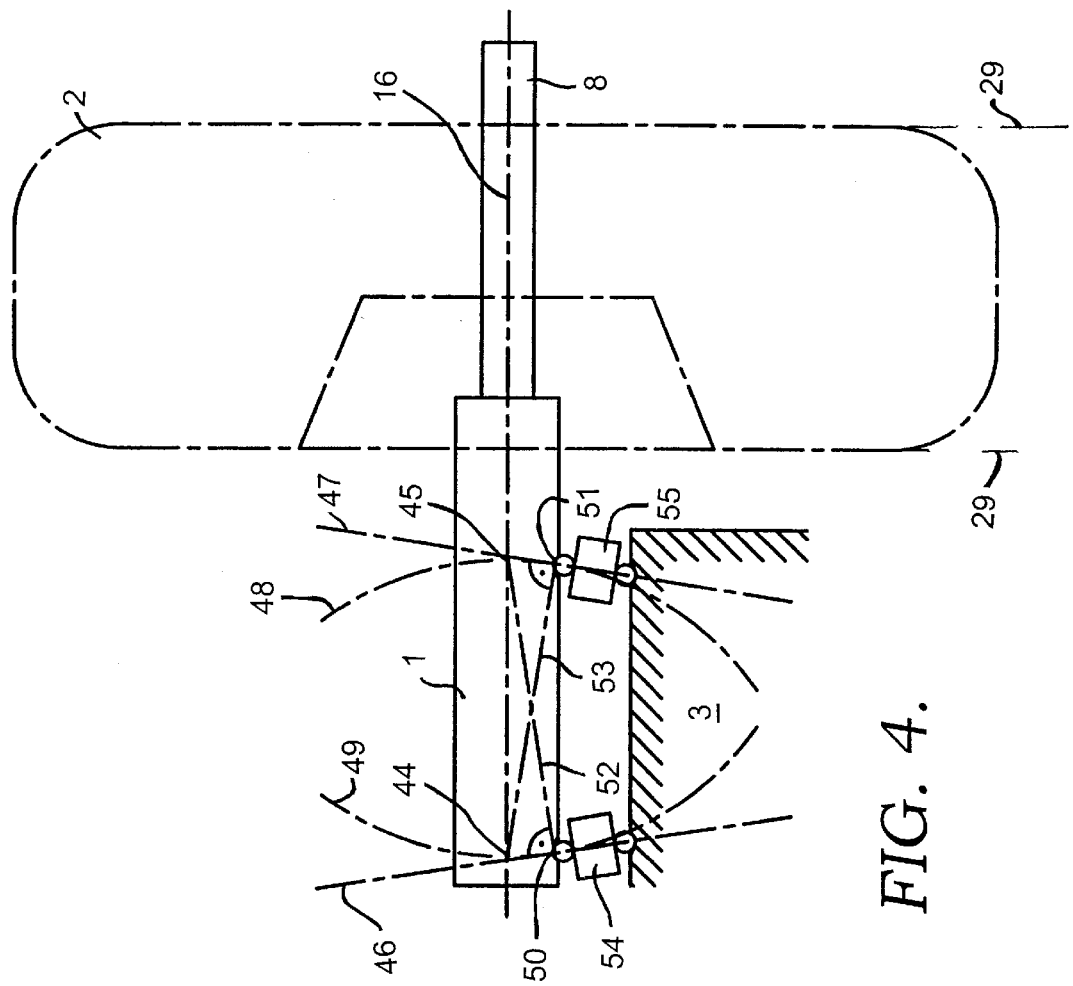
FIG. 4 is a diagrammatic view of a third embodiment of the apparatus according to the invention with real measurement sensors.
Figure 5:
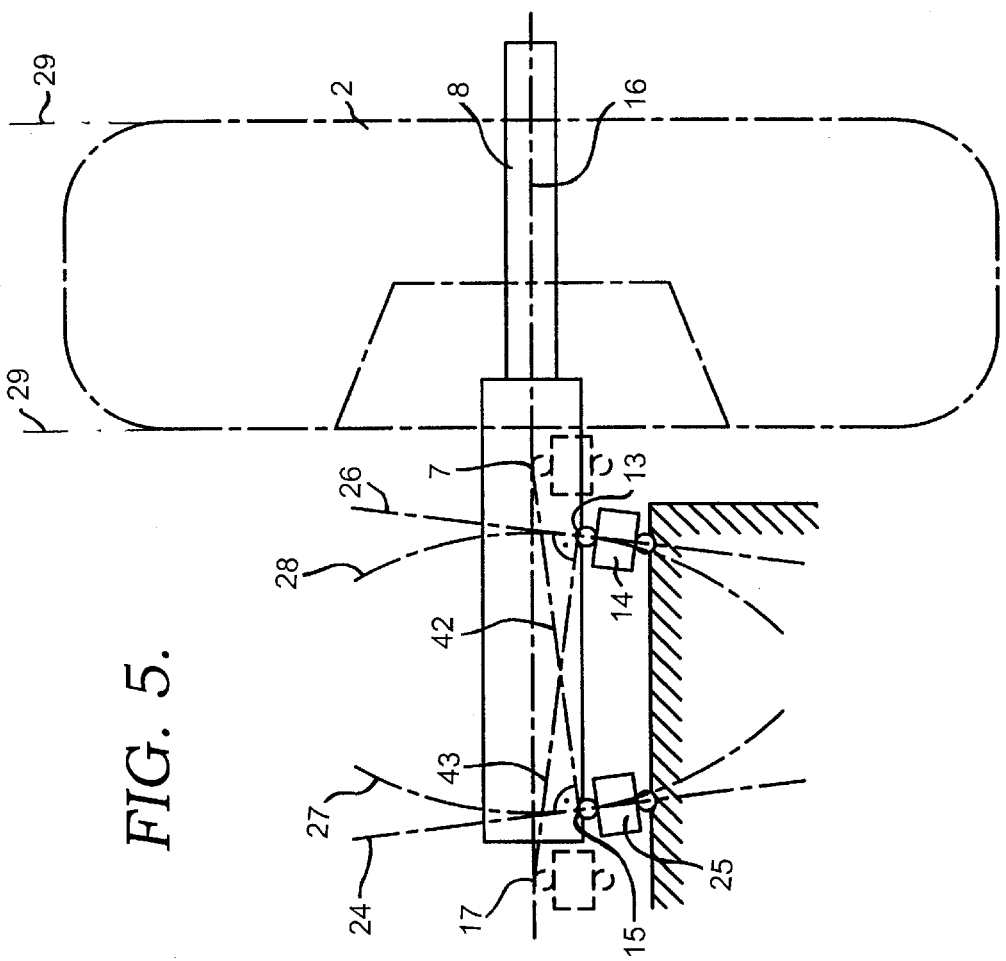
FIG. 5 is a diagrammatic view of a fourth embodiment of the apparatus according to the invention.

Referring now jointly to FIGS. 4 and 5, in the embodiments illustrated therein the rotary mounting 1 for the measurement shaft 8 is supported with respect to the stationary frame 3 at first and second support locations which are at an axial spacing from each other. Disposed at the support locations are the measurement sensors indicated at 54 and 55 in FIG. 4, and at 14 and 25 in FIG. 5. The measurement sensors are in the form of force pick-up devices. The support locations are in the form of rigid mountings.

Looking now more specifically at FIG. 4, in the embodiment shown therein the arrangement is such that real mounting locations 44 and 45 are formed at the support locations. The direction of application of force to the measurement sensor 54 extends in the direction of a tangent 46 to a circle of which a portion is indicated at 49 and which extends around the real mounting location 45, through a force-application location 50 of the measurement sensor 54. The tangent 46 therefore extends substantially perpendicularly to a connecting line 52 between the real mounting location 45 and the force-application location 50 on the measurement sensor 54. The real mounting location 45 is disposed in the region of the support location, at which the other measurement sensor 55 is arranged. The tangent 46 forms the direction of application of force to the measurement sensor 54. The measurement sensor 54 can be accordingly arranged inclinedly with respect to the axis 16 of the measurement shaft 8.

In the same fashion, a tangent 47 forms the direction of application of force to the other measurement sensor indicated at 55. The tangent 47 is applied to a circle of which a portion is indicated at 48 and which extends around the real mounting location 44 through the force-application location 51 of the measurement sensor 55. The tangent 47 therefore extends substantially perpendicularly to a connecting line 53 between the real mounting location 44 and the force-application location 51. The real mounting location 44 is disposed in the region of the support location in which the other measurement sensor 54 is arranged. The measurement sensor 55 is arranged, depending on the configuration of the tangent 47 constituting the direction of application of force, in a correspondingly inclined condition with respect to the axis 16 of the measurement shaft 8.

Referring to FIG. 5, in the embodiment illustrated therein the support for the rotary mounting 1 is such that, as in the embodiment of FIGS. 2 and 3, the assembly forms two virtual mounting locations indicated at 7 and 17. The positions of the virtual mounting locations 7 and 17 are afforded on the basis of a calibration procedure as is disclosed in EP 0 133 229 B1 to which attention is directed for the purposes of incorporation of the appropriate disclosure herein. As in the case of the embodiment of FIGS. 2 and 3 the direction of application of force to the measurement sensor 25 is in the direction of the tangent 24 which is applied to the circle of which a portion is indicated at 27, through the force-application location 15 of the measurement sensor 25. The circle 27 extends through the force-application location 15 around the virtual mounting location 7. The tangent 24 extends approximately perpendicularly to a connecting line as indicated at 42 between the virtual mounting location 7 and the force-application location 15 of the measurement sensor 25. The measurement sensor 25 is accordingly arranged inclinedly with respect to the axis 16 of the measurement shaft 8.

The direction of application of force to the measurement sensor 14 extends in the direction of the tangent 26 to the circle 28 at the force-application location 13 of the measurement sensor 14. The circle 28 extends around the virtual mounting location 17, through the force-application location 13. The tangent 26 therefore extends substantially perpendicularly to the connecting line 43 between the virtual mounting location 17 and the force-application location 13 of the measurement sensor 14. The measurement sensor 14 is also correspondingly arranged inclinedly with respect to the axis 16 of the measurement shaft 8.

If, in the embodiments of FIGS. 4 and 5, the angle between the respective connecting lines 52 and 53 in FIG. 4 and 42 and 43 in FIG. 5 and the axis 16 of the measurement shaft 8 is extremely small, the respective tangent can extend approximately perpendicularly to the axis 16 of the measurement shaft 8.

It will be appreciated that the above-described embodiments of the invention have been set forth solely by way of example and illustration of the principles thereof and that various other modifications and alterations may be made therein without thereby departing from the spirit and scope of the invention.

What is claimed is:

1. Apparatus for measuring centrifugal forces produced by an unbalanced rotary member, comprising a support, at least one measurement sensor having a force-application location for the application of force thereto and being supported on the support, a rotary member mounting means for supporting the rotary member with respect to the support, wherein the rotary member mounting means with a rotary member mounted thereto form a system which is oscillatable about an oscillation center for applying centrifugal forces to the force-application location, wherein the rotary member mounting means and the rotary member, which in operation is supported thereby and which rotates in a measurement operation, form a sub-critical oscillating assembly, and the direction of application of force to the at least one measurement sensor extends substantially tangentially with respect to a circular arc through the force-application location around the oscillation center.

2. Apparatus as set forth in claim 1 wherein the oscillation center is in the form of an oscillation axis extending perpendicularly to an axis of rotation of the rotary member.

3. Apparatus as set forth in claim 1 and further including a measurement shaft, and means on the measurement shaft for securing a rotary member thereto, wherein the rotary member mounting means includes a rotary mounting for the measurement shaft.

4. Apparatus as set forth in claim 1 comprising first and second flexurally stiff supports forming the oscillation center and being arranged so that notional prolongations thereof intersect at a virtual mounting location.

5. Apparatus as set forth in claim 3 and further comprising an intermediate support, first and second flexurally stiff supports supporting the rotary member mounting means on the intermediate support, third and fourth supports connecting the intermediate support to the support, wherein with each of the first, second, third and fourth supports having a notional prolongation and at least one of the first and second supports or the third and fourth supports, respectively, having intersecting prolongations forming a respective virtual mounting location, a first measurement sensor having a first force-application location and operatively supporting the rotary member mounting means to said intermediate support, a second measurement sensor having a second force-application location and operatively supporting the intermediate support to said support, and the arrangement being such that at least one of said first and second measurement sensors has a direction of application of force thereto having a tangential relationship with an arc which passes through its respective virtual mounting location and which extends through its respective force-application location.

6. Apparatus as set forth in claim 5 wherein said virtual mounting location is between balancing planes in which a balancing operation is executed on the rotary member.

7. Apparatus as set forth in claim 4 including a measurement shaft having an axis, and means on the measurement shaft for securing a rotary member thereto, wherein the first and second supports are in the form of flexurally stiff supports plates providing rectilinear virtual mounting locations which extend in perpendicular relationship to the axis of the measurement shaft and in parallel relationship to the surfaces of the first and second supports.

8. Apparatus as set forth in claim 7 wherein the support plates are leaf spring members.

9. Apparatus as set forth in claim 5 including a measurement shaft having an axis, and means on the measurement shaft for securing a rotary member thereto, wherein the first, second, third and fourth supports are in the form of flexurally stiff support plates providing rectilinear virtual mounting locations which extend in perpendicular relationship to the axis of the measurement shaft and in parallel relationship to the surfaces of the first, second, third and fourth supports.

10. Apparatus as set forth in claim 9 wherein the support plates are leaf spring members.

11. Apparatus as set forth in claim 5 including first and second virtual mounting locations formed by the first and second and by the third and fourth support members, respectively, and disposed at respective sides of the intermediate support.

12. Apparatus as set forth in claim 5 including first and second virtual mounting locations at one side of the intermediate support.

13. Apparatus as set forth in claim 3 including means for supporting the rotary member mounting means for the measurement shaft relative to said support at first and second axially mutually spaced support locations which form rigid mountings and at which first and second measurement sensors are arranged, thereby forming first and second support locations.

14. Apparatus as set forth in claim 13 wherein the first and second support locations are real support locations.

15. Apparatus as set forth in claim 13 wherein the first and second support locations are virtual support locations.

* * * * *